United States Patent
May et al.

(10) Patent No.: US 11,365,338 B2
(45) Date of Patent: Jun. 21, 2022

(54) SOLID SHALE INHIBITOR ADDITIVES

(71) Applicant: Halliburton Energy Services, Inc., Houston, TX (US)

(72) Inventors: Preston Andrew May, Porter, TX (US); Jeffrey James Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/591,781

(22) Filed: Oct. 3, 2019

(65) Prior Publication Data

US 2021/0102108 A1 Apr. 8, 2021

(51) Int. Cl.
*E21B 21/00* (2006.01)
*C09K 8/12* (2006.01)
*C09K 8/504* (2006.01)
*C09K 8/508* (2006.01)

(52) U.S. Cl.
CPC .............. *C09K 8/12* (2013.01); *C09K 8/5045* (2013.01); *C09K 8/5083* (2013.01); *C09K 8/5086* (2013.01); *E21B 21/00* (2013.01); *C09K 2208/12* (2013.01); *E21B 21/003* (2013.01)

(58) Field of Classification Search
CPC ...... C09K 8/12; C09K 8/5045; C09K 8/5086; C09K 2208/12; E21B 21/00; E21B 21/003
See application file for complete search history.

(56) References Cited

U.S. PATENT DOCUMENTS

| | | | |
|---|---|---|---|
| 6,209,646 B1* | 4/2001 | Reddy | C04B 40/0633 166/293 |
| 2002/0092681 A1* | 7/2002 | Patel | C09K 8/68 175/64 |
| 2003/0008779 A1* | 1/2003 | Chen | C08F 251/00 507/200 |
| 2003/0104949 A1* | 6/2003 | Myers | C09K 8/46 507/100 |
| 2003/0230431 A1* | 12/2003 | Reddy | C09K 8/12 175/64 |
| 2010/0193244 A1* | 8/2010 | Hoskins | E21B 21/003 175/5 |

(Continued)

FOREIGN PATENT DOCUMENTS

WO 2018/136032 A1 7/2018

OTHER PUBLICATIONS

International Search Report and Written Opinion issued in related PCT Application No. PCT/US2019/054645 dated Jun. 30, 2020, 12 pages.

(Continued)

*Primary Examiner* — Silvana C Runyan
(74) *Attorney, Agent, or Firm* — Tenley Krueger; Baker Botts L.L.P.

(57) ABSTRACT

Solid shale inhibitor additives and methods of using such additives to, for example, inhibit shale are provided. In some embodiments, such methods include providing an aqueous treatment fluid that includes an aqueous base fluid and a solid shale inhibitor additive, the solid shale inhibitor additive including carrier particles and a treatment composition that includes a shale inhibitor; and introducing the treatment fluid into a wellbore penetrating at least a portion of a subterranean formation.

11 Claims, 2 Drawing Sheets

(56) References Cited

U.S. PATENT DOCUMENTS

| | | |
|---|---|---|
| 2014/0262247 A1 | 9/2014 | Duenckel et al. |
| 2016/0230070 A1 | 8/2016 | Wagle et al. |
| 2016/0298015 A1 | 10/2016 | Gupta et al. |
| 2017/0210966 A1 | 7/2017 | Jung et al. |
| 2017/0362488 A1 | 12/2017 | Young et al. |
| 2018/0051200 A1 | 2/2018 | Clapper |
| 2018/0223180 A1* | 8/2018 | Hall .................. C09K 8/725 |

OTHER PUBLICATIONS

Evonik Industries: "AEROSIL® fumed silica and SIPERNAT® specialty silica as flow aid, anticaking agent and carrier; Recommended mixing procedures for powders and granulates" Technical Information TI 1213; Downloaded from: https://www.aerosil.com/product/aerosil/downloads/ti-1213-specialty-silica-as-flow-aid-anticaking-agent-and-carrier-substance-en.pdf.

* cited by examiner

SOLID SHALE INHIBITOR ADDITIVES

BACKGROUND

The present disclosure relates to methods and compositions for using shale inhibitor additives in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, among others, drilling fluids, well cleanup fluids, workover fluids, conformance fluids, gravel pack fluids, acidizing fluids, fracturing fluids, spacer fluids, and the like.

During drilling of subterranean wellbores, various strata that include reactive shales may be encountered. The term "shale" may refer to materials that may "swell," or increase in volume, when exposed to water. Examples of these shales may include certain types of clays (for example, bentonite). Reactive shales may be problematic during drilling operations because of, among other factors, their tendency to degrade when exposed to aqueous media such as aqueous-based drilling fluids. This degradation, of which swelling is one example, can result in undesirable drilling conditions and/or undesirable interference with the drilling fluid. For instance, the degradation of the shale may interfere with attempts to maintain the integrity of drilled cuttings traveling up the wellbore until such time as the cuttings can be removed by solids control equipment located at the surface.

One technique used to counteract the propensity of aqueous drilling fluids to interact with reactive shales in a formation involves the use of certain additives in aqueous drilling fluids that may inhibit shale, e.g., additives that may demonstrate a propensity for reducing the tendency of shale to absorb water. Liquid shale inhibitor additives have been used to inhibit shale, but, in certain cases, may be difficult to handle.

BRIEF DESCRIPTION OF THE DRAWINGS

These drawings illustrate certain aspects of some of the embodiments of the present disclosure and should not be used to limit or define the claims.

Figure 1:
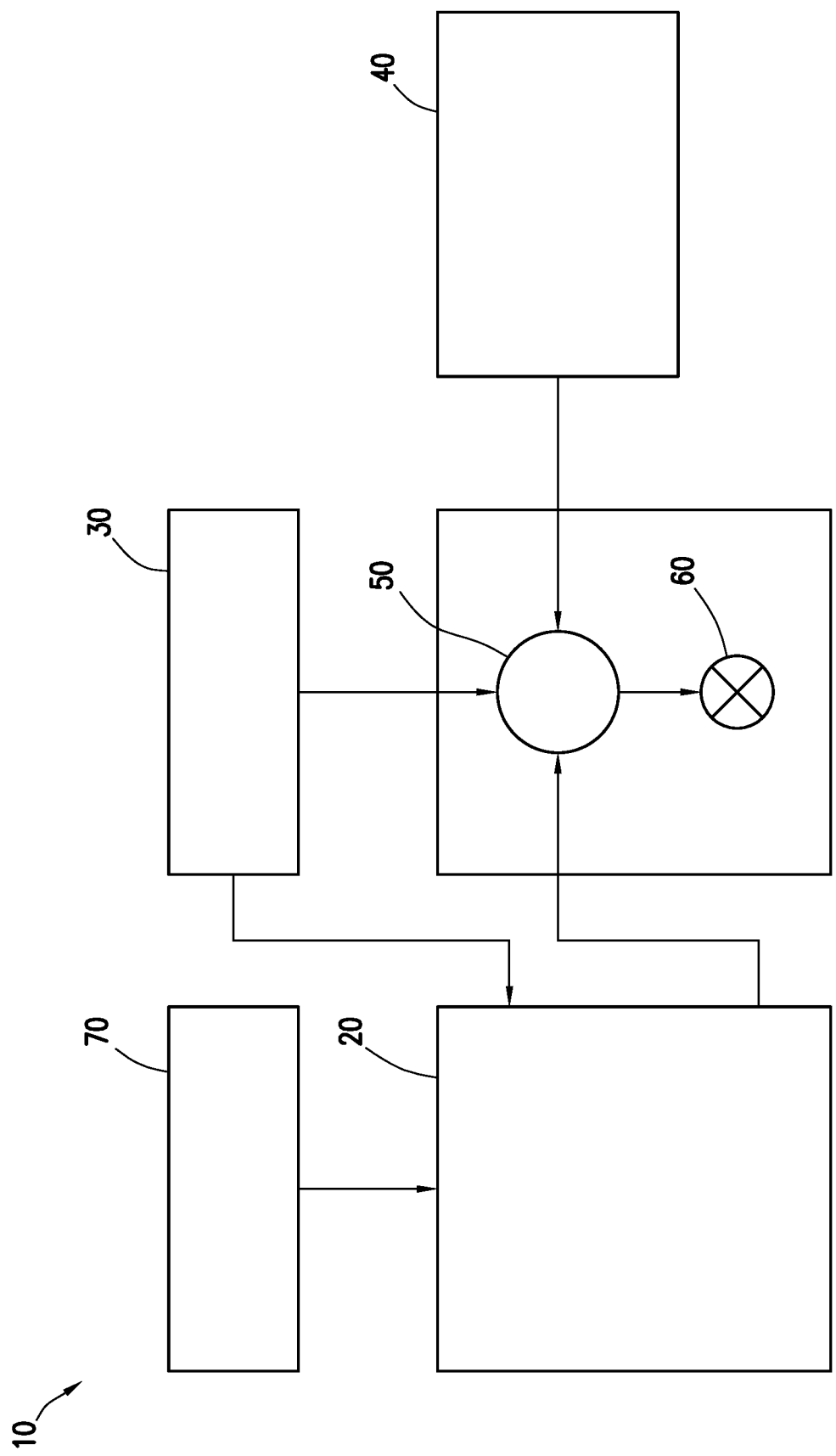
FIG. 1 is a diagram illustrating an example of a system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and compositions for use in subterranean formations, and specifically, to solid shale inhibitor additives and methods for use. More specifically, in certain embodiments, the methods of the present disclosure may include providing an aqueous treatment fluid that includes an aqueous base fluid and a solid shale inhibitor additive, the solid shale inhibitor additive including carrier particles and a treatment composition that includes a shale inhibitor; and introducing the treatment fluid into a wellbore penetrating at least a portion of a subterranean formation. In some embodiments, the methods of the present disclosure may include drilling at least a portion of a wellbore to penetrate at least a portion of a subterranean formation that includes shale; circulating a drilling fluid in at least the portion of the wellbore while drilling at least the portion of the wellbore, the drilling fluid including an aqueous base fluid, and a solid shale inhibitor additive including carrier particles and a treatment composition that includes a shale inhibitor; allowing at least a portion of the treatment composition to be released from the carrier particles; and allowing the shale inhibitor to interact with the shale in the subterranean formation to at least partially inhibit the shale.

In certain embodiments, the methods of the present disclosure may include providing a treatment fluid including an aqueous base fluid and a solid shale inhibitor additive including carrier particles and a treatment composition that includes a shale inhibitor; introducing the treatment fluid into at least a portion of a subterranean formation to contact at least a portion of the subterranean formation that includes shale and a loss zone; allowing at least a portion of the shale inhibitor to be released from the carrier particles and interact with the shale in the subterranean formation to at least partially inhibit the shale; and allowing at least a portion of the carrier particles to at least partially plug the loss zone.

Several different mechanisms may inhibit shale in subterranean formations, including, but not limited to inhibition through charge interaction (e.g., using salts and amine-based additives), blocking of pores in the formation matrix using inert materials (e.g., using nanomaterials) to prevent aqueous fluids from contacting shales in the formation, and/or at least partially encapsulating shale particles in order to at least partially stabilize shale particles and/or prevent their attrition and/or abrasion into smaller particles. As referenced herein, the phrase "inhibit shale", or variants thereof, refers to the action of one or more of these or any other inhibition mechanisms, either individually or collectively. As used herein, the term "encapsulation" and variants thereof do not imply any particular degree of encapsulation or coating, whether partial or otherwise. In some embodiments, a shale encapsulator may form a porous barrier or other structure around the outer surface of a shale particulate that may aid in holding the shale particle together and/or reducing its attrition, abrasion, and/or degradation into smaller particles.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

Among the many potential advantages to the methods and compositions of the present disclosure, only some of which are alluded to herein, the methods, compositions, and systems of the present disclosure may provide a solid shale inhibitor additive that is easier to handle than certain liquid shale inhibitor additives, which may require additional equipment (e.g., drums). In certain embodiments, the methods and compositions of the present disclosure may provide salt-free solid shale inhibitor additives. In some embodiments, the methods and compositions of the present disclosure may include carrier particles that may also serve as bridging agents or filtration control agents in the wellbore. In certain embodiments, the solid shale inhibitor additive may include a multi-component treatment composition including one or more other treatment additives in addition to the shale inhibitor. In some embodiments, loading the treatment composition onto the carrier particles may reduce dust that may be generated by certain carrier particles.

The solid shale inhibitor additive of the present disclosure may include a carrier particle and a treatment composition. The treatment composition may include a shale inhibitor. In certain embodiments, the treatment composition may include one or more additional treatment additives in addition to the shale inhibitor. In some embodiments, the carrier particles of the present disclosure may carry one or more treatment additives for addition to a treatment fluid. In certain embodiments, the one or more treatment additives may be adsorbed, absorbed, and/or loaded into or onto the carrier particles. In some embodiments, without being limited by theory one or more treatment additives may be loaded or infused into pores of the carrier particles.

In some embodiments, the treatment fluid may be an aqueous fluid, a non-aqueous fluid, an emulsion, or an invert emulsion. In certain embodiments, the treatment fluid does not include an emulsion or an invert emulsion. In certain embodiments, the carrier particles may include an inert material, a hygroscopic material, or both. Examples of materials suitable for carrier particles according to certain embodiments of the present disclosure include, but are not limited to fumed silica, crystalline silica, precipitated silica, calcium carbonate, precipitated calcium carbonate, aragonite, sepiolite, zeolite, vermiculite, diatomaceous earth, a metal oxide, lime, a clay, activated carbon, barite, and any combination thereof. In certain embodiments, the carrier particles may include powdered fumed silica, powdered crystalline silica, powdered precipitated silica, and any combination thereof. In some embodiments, the carrier particles may be a bridging agent. In some embodiments, the carrier particles may include a degradable material.

In certain embodiments, the methods of the present disclose may include introducing at least a portion of the treatment fluid within a loss zone or other flowpath through which the flow of fluids may be desirably reduced or ceased. In some embodiments, the carrier particles may reduce or prevent the loss of aqueous or non-aqueous fluids into loss zones such as voids, vugular zones, perforations, and natural or induced fractures.

In some embodiments, the carrier particles may be a powdered material. In certain embodiments, the carrier particles of the present disclosure may include particles of various sizes. In certain embodiments, the carrier particles of the present disclosure may include particles having an average particle diameter ranging from about 1 micron to about 500 microns, from about 1 micron to about 400 microns, or from about 1 microns to about 300 microns.

In certain embodiments, the carrier particles may include particles having a diameter of 500 microns or smaller, 400 microns or smaller, or 300 microns or smaller. In some embodiments, the carrier particles may include particles having a diameter of from about 1 micron to about 500 microns. In certain embodiments, the carrier particles may exhibit a particle size distribution between about 1 micron and about 2,000 microns. For example, in some embodiments, the carrier particles may have a d50 particle size distribution of from about 2.5 microns to about 1,000 microns. In certain embodiments, the carrier particles may exhibit a d50 particle size distribution of 1,000 microns or smaller, 750 microns or smaller, or 500 microns or smaller.

In certain embodiments, the carrier particles of the present disclosure may exhibit a substantially uniform particle size distribution or a multi-modal particle size distribution. As used herein, carrier particles having a "substantially uniform particle size distribution" are particles in which the standard deviation of the particle sizes in a representative sample of the particles is within about 30% of the mean (number) particle size. As used herein, carrier particles having a "multi-modal particle size distribution" are particles in which a significant number of particles are of a size an order of magnitude removed from the mean particle size. In certain embodiments, the carrier particles may include a bimodal or trimodal particle size distribution.

In some embodiments, the carrier particles may include a plurality of pores having a pore size of from about 0.1 micron to about 100 microns, from about 0.1 to about 50 microns, or from about 0.1 to about 25 microns. In certain embodiments, the carrier particles of the present disclosure may have a total porosity before or after loading of the treatment composition of from about 1% to about 33% by volume, of from about 5% to about 33% by volume, from about 6% to about 30%, from about 8% to about 28%, from about 10% to about 25%, from about 12% to about 20%, or from about 15% to about 22%, all by volume of the carrier particles.

In some embodiments the solid shale inhibitor additive and/or carrier particles of the present disclosure may have a specific gravity of 3 or less, or 2.6 or less. In certain embodiments, the solid shale inhibitor additive and/or carrier particles of the present disclosure may have a specific gravity as 1.0 to 2.6, 1.0 to 2.5, 1.0 to 2.4, 1.0 to 2.3, 1.0 to 2.2, 1.0 to 2.0, or 1.0 to 1.8. In some embodiments, the solid shale inhibitor additive may include carrier particles in an amount of about 50% or less by weight, 40% or less, 30% or less, 20% or less, or 10% or less, all by weight of the additive.

In certain embodiments, the carrier particles may include a solid powder having a carrying capacity of at least 40 volume per mass percent, while still remaining as a flowable powder while carrying the treatment composition. In some embodiments, the carrying capacity of the carrier particles may be at least 50, 60, or 65 volume per mass percent and up to 75 volume per mass percent. In certain embodiments, the treatment composition is released into the wellbore or treatment fluid upon mixing and, at least 50, 60, 70, or 80% of the treatment composition adsorbed or absorbed into the carrier particle may be released into the treatment fluid.

The treatment composition of the present disclosure may include one or more treatment additives. In some embodiments, the treatment composition may include a shale inhibitor. Examples of shale inhibitors suitable for certain embodiments of the present disclosure include, but are not limited to a primary amine, a secondary amine, a tertiary amine, a quaternary amine, a glycol, polyalkylene glycol, a polyacrylamide, a polyvinylpyrrolidone, a derivative of the foregoing, and any combination thereof. In some embodiments, the solid shale inhibitor additive may include a primary amine, a secondary amine, a tertiary amine, a quaternary amine, a derivative of the foregoing, and any combination thereof. In certain embodiments, the treatment composition may also include one or more other treatment additives. Examples of other treatment additives suitable for certain embodiments of the present disclosure include, but are not limited to a viscosifier, a wetting agent, a thinner, a rheology modifier, an emulsifier, a surfactant, a dispersant, an interfacial tension reducer, a pH buffer, a mutual solvent, a lubricant, a defoamer, a cleaning agent, and any combination thereof.

In certain embodiments, the treatment composition loaded onto the carrier particles may be a liquid treatment composition. In some embodiments, the treatment composition may include one or more salts in liquid form (e.g., dissolved in a fluid), including, but not limited to KCl, NaCl, $MgCl_2$, $CaCl_2$, and any combination thereof. In certain embodiments, the salt may include an anion selected from the group consisting of chloride, bromide, fluoride, a formate, a silicate, and any combination thereof. In some embodiments, the salt may include a cation selected from the group consisting of potassium, sodium, magnesium, calcium, aluminum, barium, cesium, and any combination thereof. For example, in certain embodiments, a salt may be dissolved in a fluid to form a solution, mixed with the shale inhibitor to form a treatment composition, and then loaded onto the carrier particles. In some embodiments, the treatment composition may include one or more starches in liquid form.

In some embodiments, the treatment composition may include an aqueous or non-aqueous carrier fluid. In certain embodiments, the treatment composition may include a solvent. Examples of solvents suitable for certain embodiments of the present disclosure include, but are not limited to an alcohol, a glycol, polyethylene glycol, acetone, and any combination thereof. In some embodiments, the solvent may include water. The treatment additives (e.g., a shale inhibitor and another treatment additive) may be present in the treatment composition that is loaded onto the carrier particles in an amount in a range of from about 0.1% to about 99% by weight, from about 0.1 to about 50% by weight, from about 10 to about 80% by weight, or from about 30 to about 70% by weight, all by weight of the treatment composition. In some embodiments, treatment additives may be present in the treatment composition that is loaded onto the carrier particles in amount of 10%, 20%, 30%, 40%, 50%, 60%, 70%, 80%, or 90% by weight or higher, all by weight of the treatment composition.

In some embodiments, the treatment composition may include a blend of two or more shale inhibitors. In certain embodiments, the treatment composition may include two or more treatment additives. In embodiments where two or more treatment additives are used, each additive may be separately adsorbed/absorbed into the carrier particles, or the treatment additives may first be mixed and then adsorbed/absorbed into the carrier particles. In some embodiments, additives may be separately adsorbed/absorbed, and the loaded carrier particles may be subsequently mixed together. For example, a shale inhibitor may be loaded on first carrier particles to form a solid shale inhibitor additive and a different treatment additive may be loaded on second carrier particles to form a solid treatment additive. When separately adsorbed/absorbed into the carrier particles and the loaded carrier particles are not mixed together, the additives may be sequentially or simultaneously added to the wellbore fluid. In some embodiments, the shale inhibitor and other treatment additives may be loaded onto the carrier particles separately or mixed together to form a liquid treatment composition prior to loading onto the carrier particles. In some embodiments, blending the liquid additives together prior to loading may result in a more homogenous distribution of the additive amongst the carrier particles, as compared to loading the additives separately.

In certain embodiments, loading of the treatment additives (e.g., the shale inhibitor) into or onto the carrier particles may be achieved by adding the treatment composition including one or more treatment additives (e.g., as a liquid solution) to the carrier particles and mixing until the desired loading is desired. Such mixing may be achieved using any type of mixer, such as a shear mixer or dynamic mixer. When mixing the carrier particles and treatment composition, the loading amount may be balanced by the carrier particles to remain flowable. In some embodiments, the treatment composition could be loaded onto the carrier particles by spraying.

In some embodiments, upon addition of the solid shale inhibitor additive into a treatment fluid, the treatment composition (e.g., shale inhibitor or a mix of shale inhibitor and other treatment additives) loaded on the carrier particles may begin to be released into the treatment fluid. In certain embodiments, the carrier particles may serve as a bridging agent, filtration control agent, or proppant before, after, or during the release of the treatment composition. In some embodiments, the carrier particles may be removed from the fluid before, during, or after a treatment operation.

In some embodiments, the solid shale inhibitor additive may be added to the treatment fluid in an amount of from about 1% to about 50% by weight of the treatment fluid (e.g., about 1%, about 5%, about 10%, about 15%, about 20%, about 25%, about 30%, about 35%, about 40%, about 45%, about 50%, etc.). In some embodiments, the solid shale inhibitor additive may be present in the treatment fluid in an amount of from about 1% to about 25% by weight of the treatment fluid. In some embodiments, the solid shale inhibitor additive may be present in an amount of from about 10% to about 25% by weight of the treatment fluid. In some embodiments, the solid shale inhibitor additive may be present in the treatment fluids in an amount of from about 0.5 pound per barrel (ppb) to about 100 ppb (e.g., to about 0.5 ppb, about 1 ppb, about 2 ppb, about 3 ppb, about 4 ppb, about 5 ppb, about 6 ppb, about 7 ppb, about 8 ppb, about 9 ppb, about 10 ppb, about 15 ppb, about 20 ppb, about 30 ppb, about 40 ppb, about 50 ppb, about 60 ppb, about 70 ppb, about 80 ppb, about 90 ppb, about 100 ppb, etc.). In some embodiments, the solid shale inhibitor additive may be present in the treatment fluid in an amount of from about 0.5 ppb to about 20 ppb. In some embodiments, the solid shale inhibitor additive may be present in an amount of from about 0.5 ppb to about 10 ppb.

In certain embodiments, the treatment fluids of the present disclosure may include lost circulation materials or bridging agents. Examples of additional lost circulation materials or bridging agents suitable for certain embodiments of the present disclosure include, but are not limited to ground marble, resilient graphitic carbon, walnut shells, calcium carbonate, magnesium carbonate, limestone, dolomite, iron carbonate, iron oxide, calcium oxide, magnesium oxide, perborate salts, and the like, and any combination thereof. In certain embodiments, additional lost circulation materials or bridging agents may include, but are not limited to, BARA- CARB® particulates (ground marble, available from Halliburton Energy Services, Inc.) including BARACARB® 2, BARACARB® 5, BARACARB® 25, BARACARB® 50, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.).

In some embodiments, the treatment fluids of the present disclosure optionally may include a weighting agent. Examples of suitable weighting agents include, but are not limited to barite, hematite, calcium carbonate, magnesium carbonate, iron carbonate, zinc carbonate, manganese tetraoxide, ilmenite, NaCl, KCl, $CaCl_2$, formate salts, and any combination thereof. These weighting agents may be at least partially soluble or insoluble in the treatment fluid. In some embodiments, a weighting agent may be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, etc.). In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid. Alternatively, the amount of weighting agent may be expressed by weight of dry solids. For example, the weighting agent may be present in an amount of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the weighting agent may be present in an amount of from about 1% to about 20% and, alternatively, from about 1% to about 10% by weight of dry solids.

Certain components of the treatment fluid may be provided as a "dry mix" to be combined with a base fluid and/or other components prior to or during introducing the treatment fluid into the subterranean formation. In some embodiments, dry mix compositions may be designed to be mixed with a base fluid in an amount from about 1 to about 20 gallons per 94-lb sack of dry blend (gal/sk). In certain embodiments, dry mix compositions may be suitable for use with base fluids in the amount of 10 gal/sk. In some embodiments, dry mix compositions may be suitable for use with base fluids in the amount of 13.5 gal/sk. Embodiments of the treatment fluids of the present invention may be prepared in accordance with any suitable technique. In some embodiments, the desired quantity of water may be introduced into a mixer followed by the dry blend. The dry blend may include the lost circulation material and additional solid additives, for example. Additional liquid additives, if any, may be added to the base fluid as desired prior to, or after, combination with the dry blend. This mixture may be agitated for a sufficient period of time to form a slurry. It will be appreciated by those of ordinary skill in the art, with the benefit of this disclosure, that other suitable techniques for preparing treatment fluids may be used in accordance with embodiments of the present invention.

In certain embodiments, the treatment fluids and solid shale inhibitor additives of the present disclosure may be effective over a range of pH levels. For example, in certain embodiments, the solid shale inhibitor additive of the present disclosure may provide effective shale inhibition from a pH of about 7 to about 12. Additionally, the treatment fluids of the present disclosure may be suitable for a variety of subterranean formations, including, but not limited to shale formations and carbonate formations.

The compositions used in the methods of the present disclosure may include any aqueous or non-aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, oil-in-water emulsions, or any combination thereof. The aqueous fluids may include one or more ionic species, such as those formed by salts dissolved in water. For example, seawater and/or produced water may include a variety of divalent cationic species dissolved therein. Examples of suitable oleaginous fluids that may be included in the oleaginous-based fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

In certain embodiments, the methods and compositions of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifiers, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid may be introduced at a pressure sufficient to create or enhance one or more fractures within the subterranean formation (e.g., hydraulic fracturing).

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions of the present disclosure. The methods and compositions of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like.

For example, and with reference to FIG. 1, the disclosed methods may directly or indirectly affect one or more components or pieces of equipment associated with a system 10, according to one or more embodiments. In certain embodiments, the system 10 includes a fluid producing apparatus 20, a fluid source 30, a solid shale inhibitor additive source 40, and a pump and blender system 50 and resides at the surface at a well site where a well 60 is located. The fluid can be a fluid for ready use in a treatment of the well 60. In other embodiments, the fluid producing apparatus 20 may be omitted and the fluid sourced directly from the fluid source 30.

The solid shale inhibitor additive source 40 can include solid shale inhibitor additives for combination with a fluid. The system 10 may also include additive source 70 that provides one or more additives to alter the properties of the fluid. For example, the other additives 70 can be included to reduce pumping friction, to reduce or eliminate the fluid's reaction to the geological formation in which the well is formed, to operate as surfactants, and/or to serve other functions.

The pump and blender system 50 may receive the fluid and combine it with other components, including carrier particles from the solid shale inhibitor additive source 40 and/or additional components from the additives source 70. In certain embodiments, the resulting mixture may be pumped down the well 60 at a pressure suitable to introduce the fluid into one or more permeable zones in the subterranean formation. In certain instances, the fluid producing apparatus 20, fluid source 30, and/or carrier particles 40 may be equipped with one or more metering devices or sensors (not shown) to control and/or measure the flow of fluids, solid shale inhibitor additives, proppants, diverters, bridging agents, and/or other compositions to the pumping and blender system 50. In certain embodiments, the metering devices may permit the pumping and blender system 50 to source from one, some, or all of the different sources at a given time, and may facilitate the preparation of fluids in accordance with the present disclosure using continuous mixing or "on-the-fly" methods. Thus, for example, the pumping and blender system 50 can provide just fluid into the well at some times, just additives at other times, and combinations of those components at yet other times.

While not specifically illustrated herein, the disclosed methods and systems may also directly or indirectly affect any transport or delivery equipment used to convey wellbore compositions to the system 50 such as, for example, any transport vessels, conduits, pipelines, trucks, tubulars, and/or pipes used to fluidically move compositions from one location to another, any pumps, compressors, or motors used to drive the compositions into motion, any valves or related joints used to regulate the pressure or flow rate of the compositions, and any sensors (e.g., pressure and temperature), gauges, and/or combinations thereof, and the like.

Figure 2:
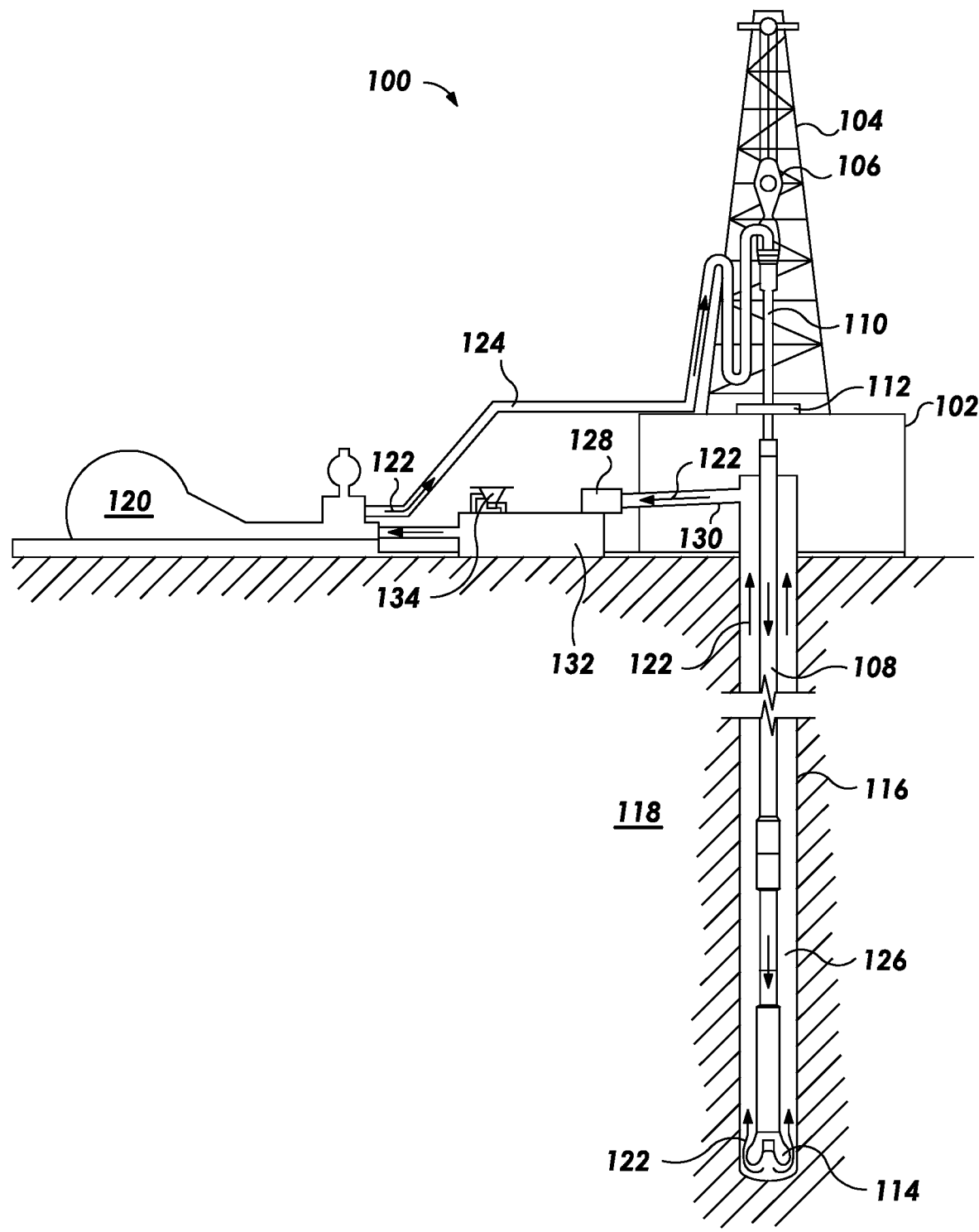
FIG. 2 is a diagram illustrating an example of a wellbore drilling assembly that may be used in accordance with certain embodiments of the present disclosure.

For example, and with reference to FIG. 2, the solid shale inhibitor additives of the present disclosure may directly or indirectly affect one or more components or pieces of equipment associated with an exemplary wellbore drilling assembly 100, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the wellbore 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. The solid shale inhibitor additives of the present disclosure may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the solid shale inhibitor additives of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the solid shale inhibitor additives of the present disclosure may be stored, reconditioned, and/or regulated until added to the wellbore fluid 122.

As mentioned above, the solid shale inhibitor additives of the present disclosure may directly or indirectly affect the components and equipment of the drilling assembly 100. For example, the solid shale inhibitor additives of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary lost circulation materials.

The solid shale inhibitor additives of the present disclosure may directly or indirectly affect the pump 120, which representatively includes any conduits, pipelines, trucks, tubulars, and/or pipes used to fluidically convey the lost circulation materials downhole, any pumps, compressors, or motors (e.g., topside or downhole) used to drive the lost circulation materials into motion, any valves or related joints used to regulate the pressure or flow rate of the shale inhibitor additive, and any sensors (i.e., pressure, temperature, flow rate, etc.), gauges, and/or combinations thereof, and the like. The solid shale inhibitor additive of the present disclosure may also directly or indirectly affect the mixing hopper 134 and the retention pit 132 and their assorted variations.

The solid shale inhibitor additives of the present disclosure may also directly or indirectly affect the various downhole equipment and tools that may come into contact with the solid shale inhibitor additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The solid shale inhibitor additives of the present disclosure may also directly or indirectly affect any downhole heat exchangers, valves and corresponding actuation devices, tool seals, packers and other wellbore isolation devices or components, and the like associated with the wellbore 116. The solid shale inhibitor additives of the present disclosure may also directly or indirectly affect the drill bit 114, which may include, but is not limited to roller cone bits, PDC bits, natural diamond bits, any hole openers, reamers, coring bits, etc.

The methods and compositions of the present disclosure may also directly or indirectly affect the various downhole equipment and tools that may come into contact with the fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

An embodiment of the present disclosure is a method including: providing an aqueous treatment fluid that comprises an aqueous base fluid and a solid shale inhibitor additive, the solid shale inhibitor additive comprising carrier particles and a treatment composition that comprises a shale inhibitor; and introducing the treatment fluid into a wellbore penetrating at least a portion of a subterranean formation. In one or more embodiments described above, the method further includes allowing at least a portion of the treatment composition to be released from the carrier particles into the treatment fluid. In one or more embodiments described above, the treatment composition further includes an additive selected from the group consisting of: a viscosifier, a wetting agent, a thinner, a rheology modifier, an emulsifier, a surfactant, a dispersant, an interfacial tension reducer, a pH buffer, a mutual solvent, a lubricant, a defoamer, a cleaning agent, and any combination thereof. In one or more embodiments described above, the carrier particles include particles having an average particle diameter of from about 1 micron to about 500 microns. In one or more embodiments described above, the carrier particles are selected from the group consisting of: fumed silica, crystalline silica, precipitated silica, and any combination thereof. In one or more embodiments described above, the solid shale inhibitor additive includes a shale inhibitor selected from the group consisting of: a primary amine, a secondary amine, a tertiary amine, a quaternary amine, a glycol, polyalkylene glycol, a polyacrylamide, a polyvinylpyrrolidone, a derivative of the foregoing, and any combination thereof. In one or more embodiments described above, the solid shale inhibitor additive includes carrier particles in an amount of about 50% or less by weight. In one or more embodiments described above, the carrier particles have a porosity of from about 1% to about 33% by volume prior to combination with the treatment composition. In one or more embodiments described above, the carrier particles are selected from the group consisting of: fumed silica, crystalline silica, precipitated silica, calcium carbonate, precipitated calcium carbonate, aragonite, sepiolite, zeolite, vermiculite, diatomaceous earth, a metal oxide, lime, a clay, activated carbon, barite, and any combination thereof. In one or more embodiments described above, the carrier particles are in the form of a powder. In one or more embodiments described above, the solid shale inhibitor additive is added to the treatment fluid in an amount of from about 1% to about 50% by weight of the treatment fluid.

Another embodiment of the present disclosure is a method including: drilling at least a portion of a wellbore to penetrate at least a portion of a subterranean formation that includes shale; circulating a drilling fluid in at least the portion of the wellbore while drilling at least the portion of the wellbore, the drilling fluid including an aqueous base fluid, and a solid shale inhibitor additive including carrier particles and a treatment composition that includes a shale inhibitor; allowing at least a portion of the treatment composition to be released from the carrier particles; and allowing the shale inhibitor to interact with the shale in the subterranean formation to at least partially inhibit the shale.

In one or more embodiments described above, the carrier particles include particles having an average particle diameter of from about 1 micron to about 500 microns. In one or more embodiments described above, the carrier particles are selected from the group consisting of: fumed silica, crystalline silica, precipitated silica, and any combination thereof. In one or more embodiments described above, the solid shale inhibitor additive includes a shale inhibitor selected from the group consisting of: a primary amine, a secondary amine, a tertiary amine, a quaternary amine, a glycol, polyalkylene glycol, a polyacrylamide, a polyvinylpyrrolidone, a derivative of the foregoing, and any combination thereof. In one or more embodiments described above, the carrier particles have a porosity of from about 1% to about 33% by volume prior to combination with the treatment composition.

Another embodiment of the present disclosure is a method including: providing a treatment fluid including an aqueous base fluid and a solid shale inhibitor additive including carrier particles and a treatment composition that includes a shale inhibitor; introducing the treatment fluid into at least a portion of a subterranean formation to contact at least a portion of the subterranean formation that includes shale and a loss zone; allowing at least a portion of the shale inhibitor to be released from the carrier particles and interact with the shale in the subterranean formation to at least partially inhibit the shale; and allowing at least a portion of the carrier particles to at least partially plug the loss zone.

In one or more embodiments described above, the carrier particles are selected from the group consisting of: fumed silica, crystalline silica, precipitated silica, and any combination thereof. In one or more embodiments described above, the shale inhibitor is selected from the group consisting of: a primary amine, a secondary amine, a tertiary amine, a quaternary amine, a glycol, polyalkylene glycol, a polyacrylamide, a polyvinylpyrrolidone, a derivative of the foregoing, and any combination thereof. In one or more embodiments described above, the carrier particles have a porosity of from about 1% to about 33% by volume prior to combination with the treatment composition.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    providing an aqueous treatment fluid that comprises an aqueous base fluid and a solid shale inhibitor additive, the solid shale inhibitor additive comprising carrier particles and a liquid treatment composition that comprises a shale inhibitor selected from the group consisting of: a primary amine, a secondary amine, a tertiary amine, a quaternary amine, a glycol, polyalkylene glycol, a polyvinylpyrrolidone, a derivative of the foregoing, and any combination thereof,
    wherein the carrier particles are in the form of a powder;
    wherein the carrier particles consist of a material selected from the group consisting of: fumed silica, crystalline silica, precipitated silica, calcium carbonate, precipitated calcium carbonate, aragonite, sepiolite, zeolite, vermiculite, diatomaceous earth, a metal oxide, lime, a clay, activated carbon, barite, and any combination thereof; and
    wherein the liquid treatment composition is loaded onto the carrier particles;
    introducing the treatment fluid into a wellbore penetrating at least a portion of a subterranean formation comprising a loss zone;
    allowing at least a portion of the liquid treatment composition to be released from the carrier particles into the treatment fluid and interact with shale in the subterranean formation to at least partially inhibit the shale; and
    allowing at least a portion of the carrier particles to at least partially plug the loss zone.

2. The method of claim 1, wherein the liquid treatment composition further comprises an additive selected from the group consisting of: a viscosifier, a wetting agent, a thinner, a rheology modifier, an emulsifier, a surfactant, a dispersant, an interfacial tension reducer, a pH buffer, a mutual solvent, a lubricant, a defoamer, a cleaning agent, and any combination thereof.

3. The method of claim 1, wherein the carrier particles comprise particles having an average particle diameter of from about 1 micron to about 500 microns.

4. The method of claim 1, wherein the solid shale inhibitor additive comprises carrier particles in an amount of about 50% or less by weight.

5. The method of claim 1, wherein the carrier particles have a porosity of from about 1% to about 33% by volume prior to combination with the liquid treatment composition.

6. The method of claim 1, wherein the solid shale inhibitor additive is added to the treatment fluid in an amount of from about 1% to about 50% by weight of the treatment fluid.

7. A method comprising:
    drilling at least a portion of a wellbore to penetrate at least a portion of a subterranean formation that comprises shale and a loss zone;
    circulating a drilling fluid in at least the portion of the wellbore while drilling at least the portion of the wellbore, the drilling fluid comprising
    an aqueous base fluid, and
    a solid shale inhibitor additive comprising carrier particles and a liquid treatment composition that comprises a shale inhibitor selected from the group consisting of: a primary amine, a secondary amine, a tertiary amine, a quaternary amine, a glycol, polyalkylene glycol, a polyvinylpyrrolidone, a derivative of the foregoing, and any combination thereof,
    wherein the carrier particles are in the form of a powder;
    wherein the carrier particles consist of a material selected from the group consisting of: fumed silica, crystalline silica, precipitated silica, calcium carbonate, precipitated calcium carbonate, aragonite, sepiolite, zeolite, vermiculite, diatomaceous earth, a metal oxide, lime, a clay, activated carbon, barite, and any combination thereof; and wherein the liquid treatment composition is loaded onto the carrier particles;

allowing at least a portion of the liquid treatment composition to be released from the carrier particles;

allowing the shale inhibitor to interact with the shale in the subterranean formation to at least partially inhibit the shale; and allowing at least a portion of the carrier particles to at least partially plug the loss zone.

8. The method of claim 7, wherein the carrier particles comprise particles having an average particle diameter of from about 1 micron to about 500 microns.

9. The method of claim 7, wherein the carrier particles have a porosity of from about 1% to about 33% by volume prior to combination with the liquid treatment composition.

10. A method comprising:

providing a treatment fluid comprising an aqueous base fluid and a solid shale inhibitor additive comprising carrier particles and a liquid treatment composition that comprises a shale inhibitor selected from the group consisting of: a primary amine, a secondary amine, a tertiary amine, a quaternary amine, a glycol, polyalkylene glycol, a polyvinylpyrrolidone, a derivative of the foregoing, and any combination thereof, wherein the carrier particles are in the form of a powder;

wherein the carrier particles consist of a material selected from the group consisting of: fumed silica, crystalline silica, precipitated silica, calcium carbonate, precipitated calcium carbonate, aragonite, sepiolite, zeolite, vermiculite, diatomaceous earth, a metal oxide, lime, a clay, activated carbon, barite, and any combination thereof; and wherein the liquid treatment composition is loaded onto the carrier particles;

introducing the treatment fluid into at least a portion of a subterranean formation to contact at least a portion of the subterranean formation that comprises shale and a loss zone;

allowing at least a portion of the shale inhibitor to be released from the carrier particles and interact with the shale in the subterranean formation to at least partially inhibit the shale; and allowing at least a portion of the carrier particles to at least partially plug the loss zone.

11. The method of claim 10, wherein the carrier particles have a porosity of from about 1% to about 33% by volume prior to combination with the liquid treatment composition.

* * * * *